Patented Oct. 23, 1951

2,572,066

UNITED STATES PATENT OFFICE 2,572,066

TRIFLUOROMETHYL PHENYL-β-NAPHTHYLAMINES

Nathan L. Smith, Indian Head, Md.

No Drawing. Application October 30, 1950,
Serial No. 193,014

2 Claims. (Cl. 260—576)

(Granted under the act of March 3, 1883, as
amended April 30, 1928; 370 O. G. 757)

This invention relates to new compounds, more particularly to new phenyl-β-naphthylamine derivatives containing a trifluoromethyl group.

The new compounds of the invention are trifluoromethyl phenyl-β-naphthylamines which correspond to the general formula:

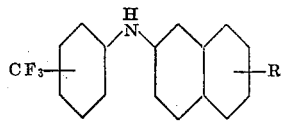

wherein R is hydrogen or the trifluoromethyl radical.

The new compounds have antioxidant activity for gasolines and petroleum oils and for synthetic lubricants such as diesters and polyethylene glycol. Due to the presence of the trifluoromethyl group in the molecule the compounds have enhanced solubilities in hydrocarbons.

The new compounds can be prepared by condensing β-naphthol or the trifluoromethyl substituted-β-naphthol, e. g., 8-trifluoromethyl-β-naphthol with the corresponding trifluoromethyl aniline, e. g., 3-trifluoromethyl aniline, in the presence of iodine as a catalyst for the condensation.

The preparation of the new compounds is illustrated by the following specific example in which parts are by weight:

*Example*

A mixture of 72 parts (0.5 mol) β-naphthol and 80.5 parts (0.5 mol) 3-trifluoromethyl aniline is heated under reflux for 24 hours in the presence of 0.5 part iodine. The resulting dark oil is taken up in toluene, washed by shaking with dilute (about 10%) aqueous sodium hydroxide, and dried over sodium sulfate. After removing the toluene by simple distillation, the residue is distilled in vacuum to obtain the product distillate which boils at 180–185° C./2 mm. The reddish-brown distillate solidifies on cooling. Recrystallization from alcohol yields white needles melting at 83–84° C.

The invention described herein may be manufactured and used by or for the Government of the United States of America for governmental purposes without the payment of any royalties thereon or therefor.

What is claimed is:

1. A trifluoromethyl phenyl-β-naphthylamine of the general formula:

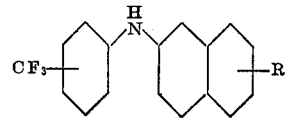

wherein R is a radical selected from the group consisting of hydrogen and the trifluoromethyl radical.

2. As a new compound, 3-(trifluoromethyl) phenyl-β-naphthylamine.

NATHAN L. SMITH.

REFERENCES CITED

The following references are of record in the file of this patent:

UNITED STATES PATENTS

| Number | Name | Date |
|---|---|---|
| 2,212,825 | Daudt et al. | Aug. 27, 1940 |
| 2,432,393 | Dickey et al. | Dec. 9, 1947 |

OTHER REFERENCES

Swarts, Beilstein (Handbuch, 4th ed.) vol. 12, p. 870 (1929).